(12) United States Patent
Gotmalm

(10) Patent No.: US 6,979,919 B2
(45) Date of Patent: Dec. 27, 2005

(54) ELECTRICAL MACHINE HAVING CENTRALLY DISPOSED STATOR

(75) Inventor: Chris Gotmalm, Hilton Beach (CA)

(73) Assignee: Teleflex Canada Incorporated, Richmond (CA)

( * ) Notice: Subject to any disclaimer, the term of this patent is extended or adjusted under 35 U.S.C. 154(b) by 0 days.

(21) Appl. No.: 10/435,554

(22) Filed: May 12, 2003

(65) Prior Publication Data

US 2004/0227415 A1    Nov. 18, 2004

(51) Int. Cl.$^7$ .............................................. H02K 9/00
(52) U.S. Cl. ........................................ 310/54; 310/64
(58) Field of Search .............................. 310/52, 54, 58, 310/64

(56) References Cited

U.S. PATENT DOCUMENTS

| | | | |
|---|---|---|---|
| 4,980,588 A | * | 12/1990 | Ogawa ..................... 310/68 D |
| 6,046,520 A | | 4/2000 | Betsch et al. |
| 6,072,253 A | | 6/2000 | Harpenau et al. |
| 6,114,784 A | * | 9/2000 | Nakano ....................... 310/59 |
| 6,160,332 A | | 12/2000 | Tsuruhara |
| 6,323,613 B1 | * | 11/2001 | Hara et al. .................. 318/471 |
| 6,559,567 B2 | * | 5/2003 | Schob ....................... 310/90.5 |

FOREIGN PATENT DOCUMENTS

WO    WO 02/28674    4/2002

* cited by examiner

Primary Examiner—Darren Schuberg
Assistant Examiner—Nguyen Hanh
(74) Attorney, Agent, or Firm—Norman M. Cameron

(57) ABSTRACT

An internal combustion engine has a liquid-cooled electrical machine mounted thereon. The liquid-cooled electrical machine includes a centrally disposed stator having stator windings. A rotor is mounted on a rotatable member for rotation therewith. The rotor extends about the stator. A cooling chamber is disposed within the stator and has an inlet for a coolant and an outlet for the coolant connected thereto.

6 Claims, 4 Drawing Sheets

ELECTRICAL MACHINE HAVING CENTRALLY DISPOSED STATOR

BACKGROUND OF THE INVENTION

This invention relates to electrical machines having centrally disposed stators and, in particular, to liquid-cooled alternators having centrally disposed stators.

Liquid-cooled generators, particularly alternators, are well known in the prior art. Many of the units are relatively large and complicated. It would be desirable to provide liquid-cooled generators or alternators for much smaller applications.

It is often of importance to obtain the highest possible efficiency when generating electricity by capturing and utilizing energy losses which occur during the process. In the case of a conventional generator, these losses are mostly waste heat which are usually vented out of the generator by means of a blower.

Such a blower draws in dirt and debris which are detrimental to the life of the bearings of the generator and may cause a fire in the generator. The air stream also carries noise from the engine-generator assembly. This noise may be difficult to dampen without disturbing the air stream or significantly increasing the size of the enclosure of the generator sets to allow for sound traps.

Liquid-cooled generators have been suggested in the past, for example in U.S. Pat. No. 6,046,520 to Betsch et al. In this example a conventional generator is surrounded by a housing and a liquid coolant is circulated in a space between the housing and the generator. The bulk of the generator is increased by the presence of the housing and water tightness of the generator is required.

Another liquid-cooled electrical machine is disclosed in U.S. Pat. No. 6,072,253 to Harpenau. As is typical of generators, the stator is on the outside and has cooling tubes connected thereto. The provision for cooling in the stator and the connections for the coolant increase the size of the machine.

Another such generator is disclosed in U.S. Pat. No. 6,160,332 to Tsuruhara. In this example a brushless generator has magnets on the centrally disposed rotor. The cooling chamber again is on the outside and extends about the exterior stator.

Despite the prior art, there is still a significant need for a compact liquid-cooled generator where the design is simple enough to minimize the cost of manufacture and, accordingly, the sale price.

It is an object of the invention to provide an improved electrical machine which is simple and compact and yet provides the benefits of liquid-cooling.

It is another object of the invention to provide a generator which can operate without bearings.

It is a still further object of the invention to provide an improved generator which has fewer parts than a conventional generator and requires less precision during manufacture and assembly.

SUMMARY OF THE INVENTION

There is provided, according to one aspect of the invention, an electrical machine having a centrally disposed stator with stator windings. There is a rotor mounted on a rotatable member for rotation therewith. The rotor extends about the stator.

There is provided, according to another aspect of the invention, a liquid-cooled electrical machine having a centrally disposed stator with stator windings. There is a rotor mounted on a rotatable member for rotation therewith. The rotor extends about the stator. A cooling chamber is disposed within the stator and has an inlet for a coolant and an outlet for the coolant connected thereto.

There is provided, according to a further aspect of the invention, a combination engine and electrical machine mounted thereon. The engine may be an internal combustion engine, an external combustion engine such as a steam engine or in general any rotating engine which has a flywheel. The electrical machine includes a centrally disposed stator having stator windings. A rotor is mounted on a rotatable member for rotation therewith.

There is provided, according to a still further aspect of the invention, a combination internal combustion engine and liquid-cooled electrical machine mounted thereon. The liquid-cooled electrical machine includes a centrally disposed stator having stator windings. A rotor is mounted on a rotatable member for rotation therewith. The rotor extends about the stator. A cooling chamber is disposed within the stator and has an inlet for a coolant and an outlet for the coolant connected thereto.

The invention offers significant advances compared to the prior art. It yields a compact electrical machine, in particular an alternator, where the stator is located centrally with the rotor extending about the stator, instead of the conventional opposite arrangement. This allows for a simplified and compact structure, particularly for liquid-cooled alternators.

Such electrical machines can be compact in size to fit in the location of a conventional air-cooled alternator. Moreover, noise is reduced compared with such air-cooled alternators and contamination by dirt and debris can be effectively eliminated. This is because the alternator can be fully enclosed.

The invention allows for the elimination of rear engine seals since the alternator or generator can be flushed with motor oil, thereby reducing a failure mode whereby the main seal leaks due to wear. Furthermore a diesel engine starter can be eliminated by using the generator as a motor to start the engine, thus reducing cost as well as enabling the complete sealing of the engine since it does not need access to the flywheel. Elimination of the flywheel on a diesel engine is also possible since the starter motor may be eliminated and the mass of the generator may be used instead of the flywheel.

Moreover, such a generator can be built without bearings and with fewer parts than a conventional generator. Less precision is required during manufacture and assembly since lineup is not critical. Thus the cost of the product can be significantly reduced.

The heat removed from the generator is not wasted. Instead the heated coolant can be used for useful purposes such as heating passenger compartments of vehicles. Thus the overall energy efficiency is increased.

BRIEF DESCRIPTION OF THE DRAWINGS

In drawings which illustrate embodiments of the invention.

DETAILED DESCRIPTION OF THE PREFERRED EMBODIMENTS

Figure 1:
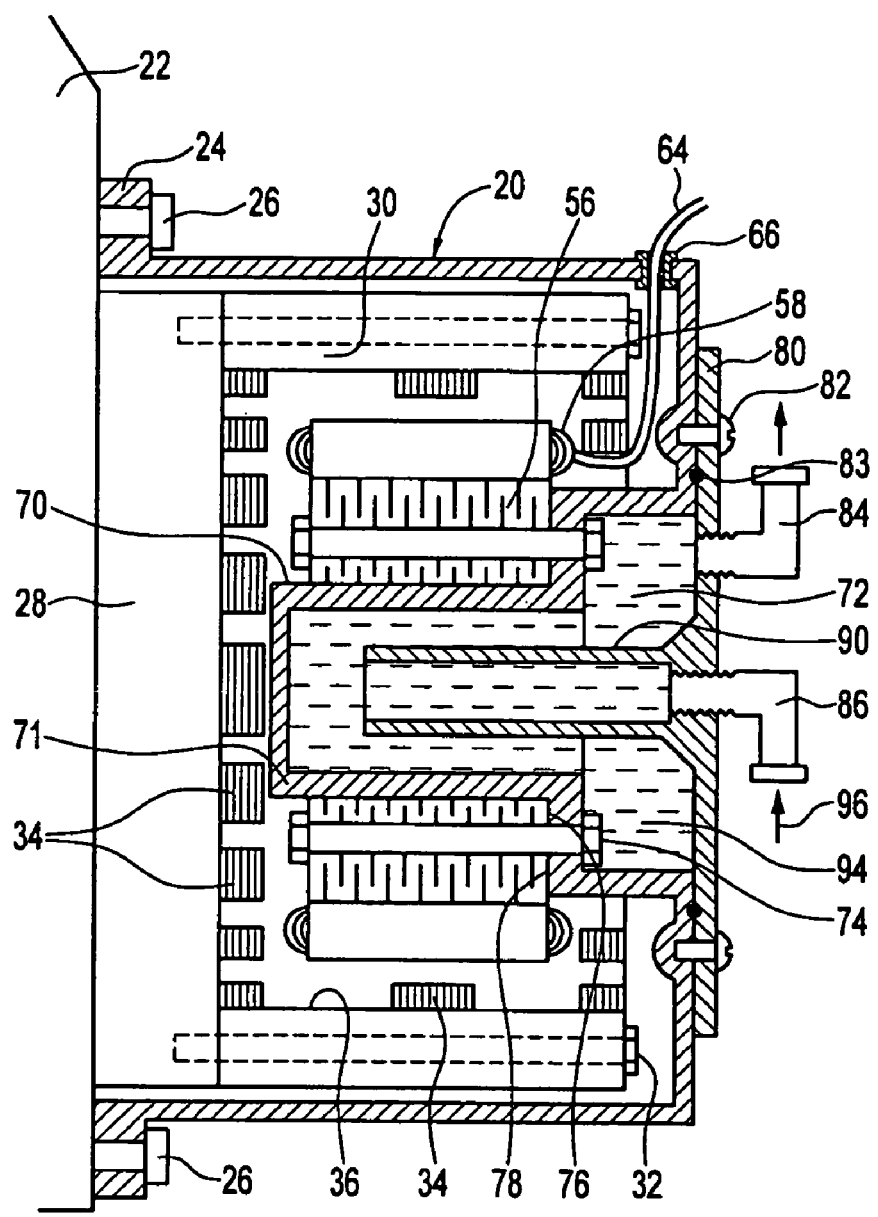
FIG. 1 is a cross-section of a liquid-cooled alternator according to an embodiment of the invention.
Figure 2:
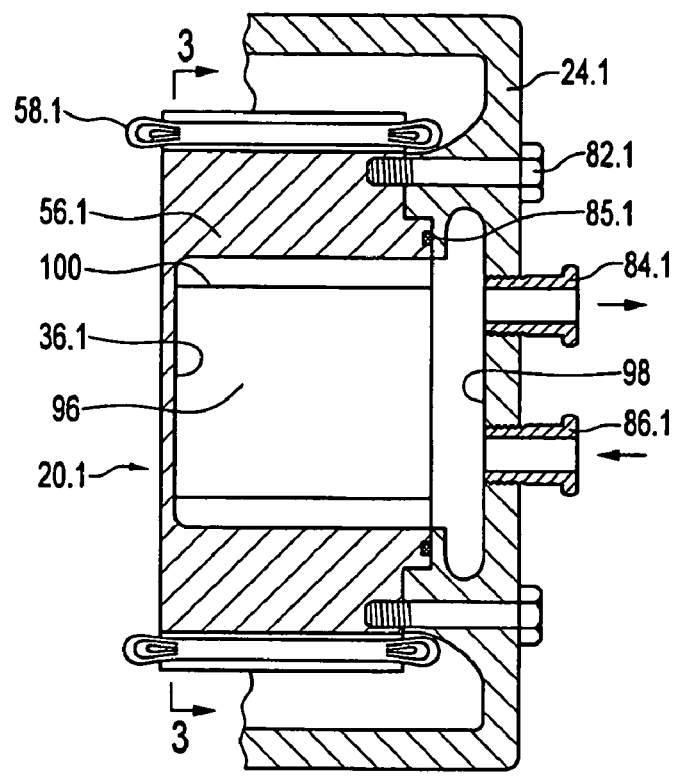
FIG. 2 is a view similar to FIG. 1 of an alternative embodiment.
Figure 3:
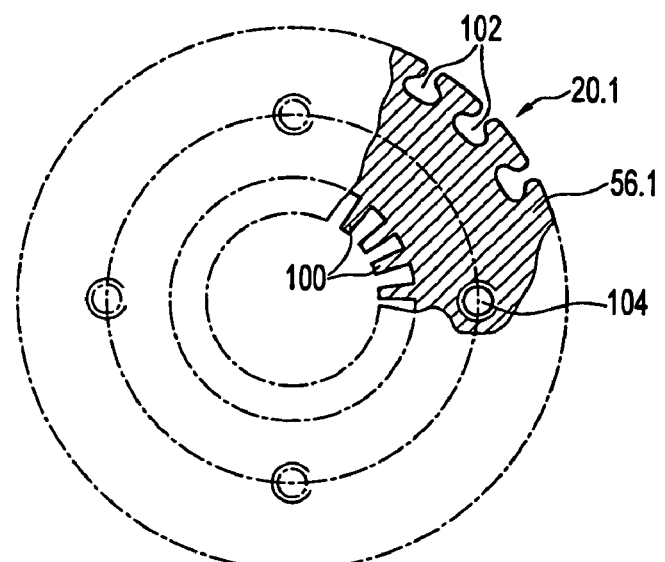
FIG. 3 is a sectional view of the stator thereof taken along line 3—3 of FIG. 2.
Figure 4:
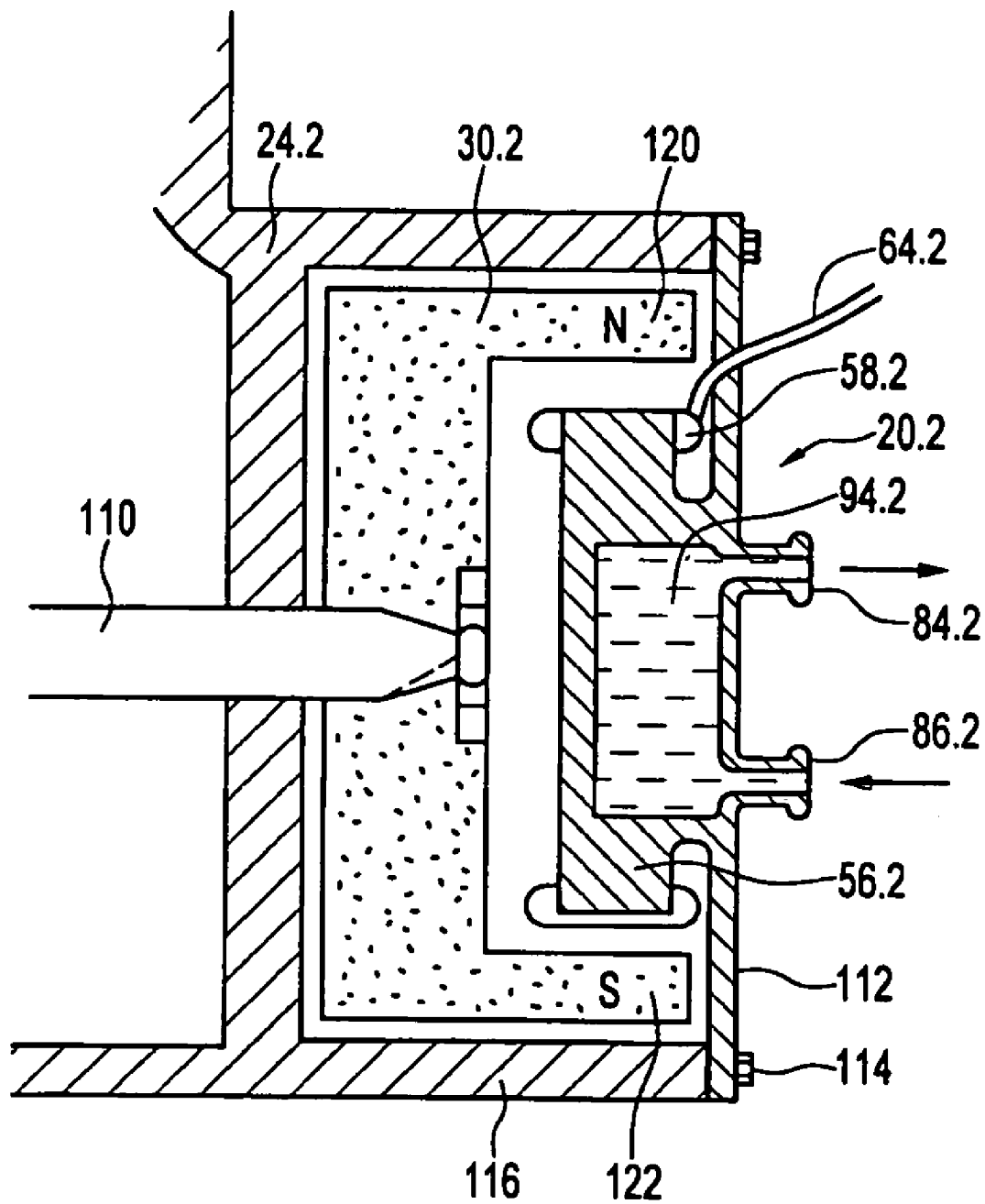
FIG. 4 is a sectional view, similar to FIG. 1, of a further embodiment of the invention.
Figure 5:
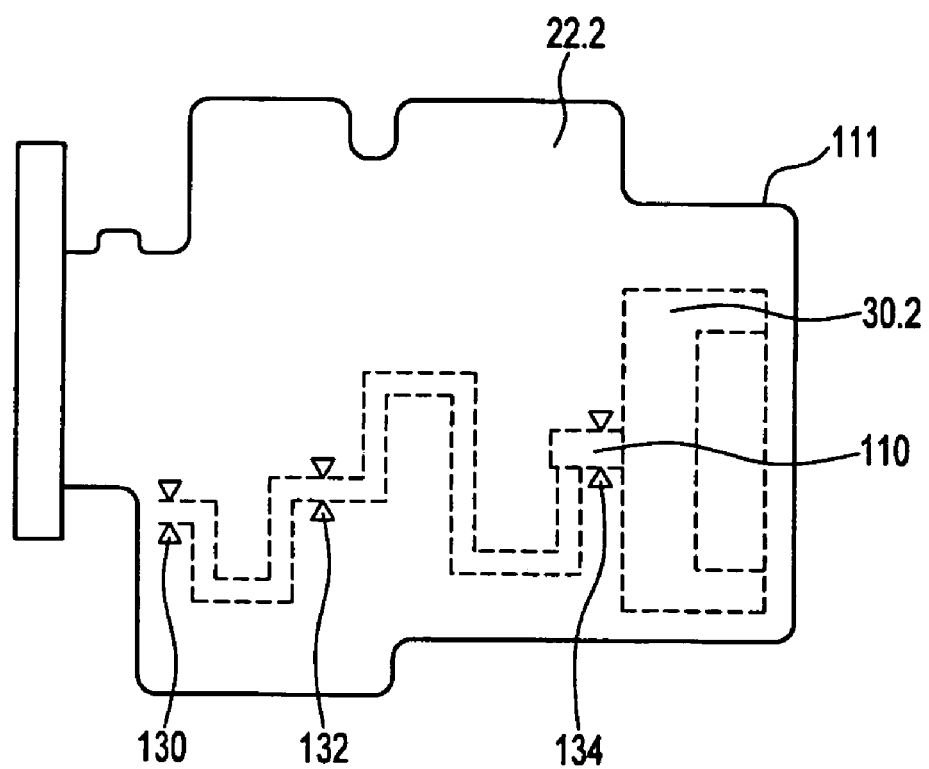
FIG. 5 is a simplified side elevation, partly broken away, of the embodiment of FIG. 4 mounted on an engine.

Referring to the drawings and first to FIG. 1, this shows an electrical machine 20 in the form of the generator, in particular an alternator, designed for use in conjunction with engine 22 which in this embodiment is an internal combustion engine although the invention is also applicable to other rotating engines including external combustion engines such as steam engines. The electrical machine acts not only as a generator, but also operates as a flywheel, replacing the conventional flywheel. FIGS. 2 and 3 illustrate an alternative embodiment where like parts have like numbers with the addition of "0.1" Likewise FIGS. 4 and 5 show a further alternative embodiment where like parts have like numbers with the addition of "0.2".

Referring back to FIG. 1, engine 22 acts as a support for housing 24 which is nonmetallic in this example. The housing is of glass fiber reinforced plastic in this example although other materials could be substituted. The housing is connected to the engine by a plurality of bolts 26. The engine is equipped with a flywheel 28. The flywheel supports a rotor 30 which rotates with the flywheel. As seen in FIG. 1, the rotor is cantilevered from the flywheel and is connected to the flywheel by a plurality of bolts 32. The rotor is annular in shape and has a plurality of permanent magnets 34 connected to inside surface 36 thereof. The quantity and orientation of the magnets, together with the rotational speed of the flywheel, determine the type of current that the generator produces. In one example 54 magnets in a two-pole arrangement are rotated at 3600 rpm to yield conventional 50 Hz AC current. If the rotational speed is 3000 rpm, then a 60 Hz current is produced. The rotational speed may be lower, for example 1800 rpm, and still produce a 50 Hz current, but the magnets are arranged in a four-pole pattern. This same pattern produces a 50 Hz current when the rotational speed is 1500 rpm.

The generator is equipped with an annular stator 56 which, in this example, is a laminated stator with copper windings 58. Leads 64 extend outwardly through aperture 66 in the housing. The stator is supported by hollow cylindrical protrusion 70 which forms part of a cup-like casing 71 for a coolant chamber 72. In this example the stator is connected to the casing by means of a plurality of bolts 74 although alternatively it may be press fitted onto protrusion 70. Where the fit is loose, it is beneficial to place thermal conductive grease on mating surfaces between the stator and the protrusion to ensure proper heat transfer. Increased heat transfer is achieved by way of annular surface 76 of the stator contacting annular surface 78 of the casing.

A cover 80 is connected to the housing by a plurality of bolts 82. A watertight seal is ensured by O-ring 83. An inlet nipple 86 and outlet nipple 84 serve as fittings for feeding coolant into the chamber and for discharging coolant from the chamber respectively. There is a tube 90 connected to the inlet nipple 86 and which projects into the protrusion 70 to prevent coolant from short-circuiting from the inlet nipple to the outlet nipple.

The chamber is cooled by a liquid coolant 94 circulated by means of an external pump, not shown. The flow direction is indicated by arrow 96. The flow of coolant through the chamber cools the generator by removing heat created by the stator.

It may be observed that no bearings are required in the generator. The rotor is entirely supported by the flywheel 28.

Referring to FIG. 2, generator 20.1 is generally similar to the embodiment above, but stator 56.1 in this example is not laminated, but is made of a watertight material such as Anchor Steel (TM) or a similar particular magnetic powder metal which has magnetic properties similar to a laminated stator core. Because the stator is watertight, a separate casing is not required, but rather the chamber is formed by internal cavity 96 in the stator together with cavity 98 in housing 24.1. A plurality of spaced apart fins 100 are formed on inside surface 36.1 of the stator to improve heat transfer between the coolant and the stator.

Referring to FIG. 3, stator 56.1 illustrates the fins 100 as well as slots 102 for receiving the windings 58.1. Also shown are threaded apertures 104 which receive the bolts 82.1.

FIGS. 4 and 5 show a further embodiment of the invention where rotor 30.2 is mounted directly on crankshaft 110 of engine 22.2 and forms the flywheel for the engine. The housing 24.2 is formed in part by an annular extension 116 of the engine block with a plate 112 connected thereto by a plurality of bolts 114. The rotor/flywheel is magnetic, having a magnetic north pole 120 and a south pole 122. The stator and chamber arrangement are similar as in the previous embodiment. The oil in the engine may be allowed to splash into the rotor area as an additional cooling device and to cool the conventional seal around the crankshaft/turboshaft. No bearings are required apart from the normal crankshaft bearings 130, 132 and 134. Shaft seals are not required since the crankshaft does not extend outside engine block 111.

All of the above embodiments work in a similar manner. As the rotor rotates, it creates a rotating magnetic field. The rotating field cuts the windings on the stator and an alternating current is induced. Waste heat from the generation of the current is captured by the circulating coolant and is pumped away, preferably for use as a source of heat.

Generators according to the invention may also be wound for multiple voltages on the same unit. This eliminates the need for power transformers on the vehicle to power lower voltage equipment.

It will be understood by someone skilled in the art that many of the details provided above are by way of example only and can be altered or deleted without departing from the scope of the invention which is to be interpreted with reference to the following claims.

What is claimed is:

1. A liquid-cooled electrical machine comprising:
   a centrally disposed stator having stator windings, the stator being annular and having a central opening;
   a rotor mounted on a rotatable member for rotation therewith, the rotor extending about the stator; and
   a cooling chamber disposed within the stator and having an inlet for a coolant and an outlet for the coolant connected thereto, the chamber including a watertight casing separating the coolant from the stator windings, the casing extending through the central opening and contacting the stator for heat transfer therebetween; and
   a housing extending about the rotor and the stator, the casing being formed in part by a portion of the housing.

2. The machine as claimed in claim 1, wherein the casing includes a plate sealingly mounted on the housing, the inlet and outlet being connected to the plate.

3. The machine as claimed in claim 2, including a tube connected to one of the inlets and the outlet and extending into the central opening of the stator to prevent short-circuiting of the coolant from the inlet into the outlet.

4. A combination engine and liquid-cooled electrical machine mounted thereon, the liquid-cooled electrical machine comprising:
- a centrally disposed stator having stator windings, the stator being annular and having a central opening;
- a rotor mounted on a rotatable member for rotation therewith, the rotor extending about the stator; and
- a cooling chamber disposed within the stator and having a inlet for a coolant and an outlet for the coolant connected thereto;
- the chamber including a watertight casing separating the coolant from the stator windings, the casing extending through the central opening and contacting the stator for heat transfer therebetween; and
- a housing extending about the rotor and the stator, the casing having a portion which is integral with the housing.

5. The combination as claimed in claim 4, wherein the casing includes a plate sealingly mounted on the housing, the inlet and outlet being connected to the plate.

6. The combination as claimed in claim 5, including a tube connected to one of the inlet and the outlet and extending into the central opening of the stator to prevent short-circuiting of the coolant from the inlet into the outlet.

* * * * *